No. 665,081. Patented Jan. 1, 1901.
H. S. FIRESTONE.
VEHICLE TIRE.
(Application filed Jan. 5, 1900.)
(No Model.)
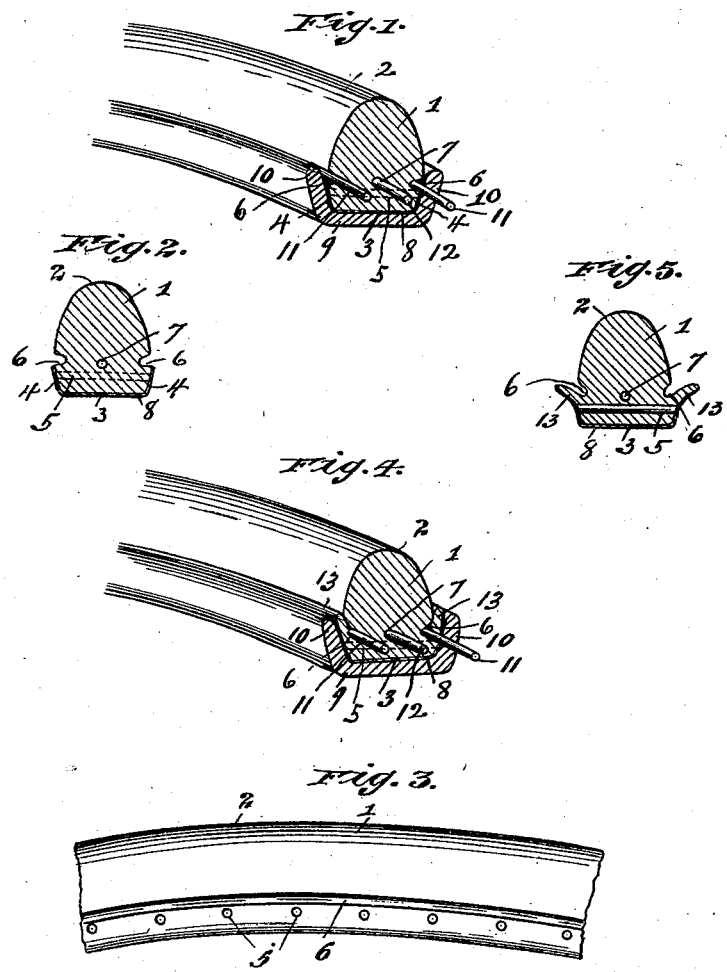
Witnesses,
S. G. Mann
Frederick G. Goodwin
Inventor,
Harvey S. Firestone,
By Offield, Towle & Linthicum,
Attys.
THE NORRIS PETERS CO., PHOTO-LITHO., WASHINGTON, D. C.

UNITED STATES PATENT OFFICE.

HARVEY S. FIRESTONE, OF CHICAGO, ILLINOIS, ASSIGNOR OF ONE-HALF TO GEORGE B. DRYDEN, OF SAME PLACE.

VEHICLE-TIRE.

SPECIFICATION forming part of Letters Patent No. 665,081, dated January 1, 1901.

Application filed January 5, 1900. Serial No. 453. (No model.)

*To all whom it may concern:*

Be it known that I, HARVEY S. FIRESTONE, of Chicago, in the county of Cook and State of Illinois, have invented a certain new and useful Improvement in Vehicle-Tires, of which the following is a specification.

This invention relates to vehicle-tires, and more particularly to that class of tires known as "elastic" tires. It has heretofore been proposed to secure such tires to the wheel by means of a channeled metal rim, in which the rubber tire is seated, said rubber tire being provided with transverse pins or bars at intervals and being held in position by circumferential wires lying between the tire and the flanges of the channeled rim and bearing upon the ends of the transverse pins to hold them and the tire firmly in place. It has been found that in the case of tires of this type of considerable width the transverse pins or bars are liable to buckle or bend, their central portions springing outward and their ends drawing toward the middle of the channel, and thereby permitting the circumferential retaining-wires to slip past the ends of the said pins or bars, thus allowing the tire to become detached. It is the object of my present invention to overcome this difficulty and provide a construction whereby tires of this type may be more firmly secured in position in the rim and whereby the construction just referred to is adapted for use in wide tires.

To these ends my invention consists in certain novel features, which I will now proceed to describe and will then particularly point out in the claims.

In the accompanying drawings, Figure 1 is a perspective view, partly in transverse section, of a portion of a tire embodying my invention, the same being shown in place in a rim adapted for its reception. Fig. 2 is a transverse sectional view of the tire proper detached. Fig. 3 is a side elevation of the same. Fig. 4 is a view similar to Fig. 1, illustrating a modified form of my invention; and Fig. 5 is a view similar to Fig. 2, illustrating the construction shown in Fig. 4.

In the said drawings, 1 indicates the tire proper, which is constructed of rubber or other suitable elastic material and is provided with an outer portion of diminishing width toward the tread, as indicated at 2, and an inner portion shaped to fit a channeled rim to which it is to be applied and having a flat bottom portion 3 and outwardly-diverging side portions 4. Within this inner portion are arranged at intervals transverse bars or pins 5, which extend to the lateral surfaces of the tire, these bars being conveniently made of wire or the like. The sides of the tire lying outwardly beyond these pins are provided with open grooves or channels 6 to receive the circumferential retaining-wires hereinafter referred to. The tire is also provided with an internal passage-way 7 outwardly beyond the central portion of the pins 5. The inner portion of the tire may, if desired, be provided with a covering 8 of canvas or other fabric.

9 indicates the metal rim or channel in which the tire is to be seated, said rim or channel being provided with outwardly-diverging flanges 10, thereby forming a groove or seat within which the tire 1 fits. The tire is held in position by circumferential retaining-wires 11, which when the parts are assembled in position are seated in the grooves or channels 6 and bear against the ends of the pins or bars 5, and thereby prevent displacement of the tire.

12 indicates an intermediate retaining-wire which is located within the longitudinal passage 7 and bears upon the intermediate portions of the pins or bars 5. It will be understood, of course, that the several retaining-wires have their ends joined in any approved manner.

It will be seen that the intermediate retaining-wire 12 by bearing upon those portions of the transverse pins or bars which lie between their ends will effectually prevent any upward bending or doubling of these latter such as would permit the outer retaining-wires to slip past the ends of the said pins or bars, and thus become ineffectual as retaining devices. The intermediate wire thus not only becomes an effective retaining device in itself, but it also coöperates with the transverse pins or bars to maintain the efficiency of the outer retaining-wires in holding the tire in position in the rim.

It will be understood, of course, that although I have shown only a single intermediate retaining-wire the number of these retaining-wires which lie within the body of the tire may be increased according to the increasing width of the tire through controlling conditions.

In Figs. 4 and 5 of the drawings I have shown a construction in which the tire is provided with means for covering and protecting the outer retaining-wires to prevent the access thereto of dirt or moisture and the consequent wear or corrosion of the wires. In this construction the tire is provided with wings or flaps 13, united to the body of the tire near its base and extending upward along the sides thereof, as shown. It will be seen that when the tire is seated in the rim, as shown in Fig. 4, these wings or flaps will be compressed between the body of the tire and the flanges of the rim and will cover and effectually close the grooves 6, thereby at the same time covering and protecting the outer retaining-wires 11 and preventing the access of dirt or moisture thereto and the consequent deterioration or failure of said wires.

I do not wish to be understood as limiting my invention to the precise details hereinbefore set forth, and shown in the drawings, as modifications thereof may obviously be made without departing from the principle of my invention.

I claim—

1. The combination, with a channeled metallic rim, of a rubber tire fitting within said rim and provided with transverse metal bars or retaining-pieces in its inclosed portion, external retaining-wires passing around said tire and bearing against the ends of the bars or retaining-pieces, and an internal retaining-wire extending through the rubber tire outward from the bars or retaining-pieces and adapted to prevent bending or buckling of the same, substantially as described.

2. The combination, with a channeled metallic rim, of a rubber tire fitting within said rim and provided at each side with a groove or channel, metal bars or retaining-pieces extending transversely of the tire inward from said grooves, external retaining-wires located in said grooves and bearing on the retaining-pieces, and an internal retaining-wire located in the rubber tire outward from the retaining-pieces and adapted to prevent bending or buckling thereof, substantially as described.

3. The combination, with a channeled metallic rim, of a rubber tire having transverse retaining-pieces in its inclosed portion and lateral wings located between the side flanges of the channel and the body of the tire, external retaining-wires bearing upon the ends of the retaining-pieces and covered and protected by the wings, and an internal retaining-wire located in the body of the tire outward from the retaining-pieces and adapted to prevent buckling or bending of the same, substantially as described.

HARVEY S. FIRESTONE.

Witnesses:
 IRVINE MILLER,
 L. F. MCCREA.